July 22, 1941.  J. V. CAVALERO  2,249,944
BANK AND MAGAZINE
Filed Nov. 7, 1938

INVENTOR.
JOHN V. CAVALERO.
BY Paul A. Talbot.
ATTORNEY.

Patented July 22, 1941

2,249,944

UNITED STATES PATENT OFFICE 2,249,944

BANK AND MAGAZINE

John V. Cavalero, Bloomfield, N. J.

Application November 7, 1938, Serial No. 239,317

2 Claims. (Cl. 232—5)

My invention relates to a portable bank and a magazine for holding tokens, medals, buttons, emblems and the like and particularly relates to flat currency depositories suitable for mailing, and has among its objects to provide:

A bank and magazine for tokens, etc. one of which is removed upon each deposit in the bank to account for the deposits in the bank.

A bank, magazine and tokens removable from a fixed position in the magazine to facilitate the raising of money through the sale of the tokens and to account for the deposits in the bank made from the sales of the tokens.

A flat bank and token magazine for mailing currency and tokens.

A light convenient depository for church drives for funds and an accounting device by tokens, etc.

A means of checking deposits by the sale of tokens, etc.

I accomplish these and other objects by the construction herein described and shown in the drawing forming a part hereof in which.

Similar reference characters refer to similar parts throughout the several views of the drawing and in the specification to follow.

Figure 1:
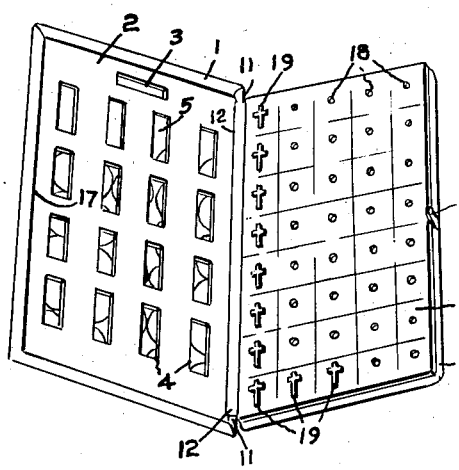
Figs. 1 and 2 are perspective views.
Figure 2:
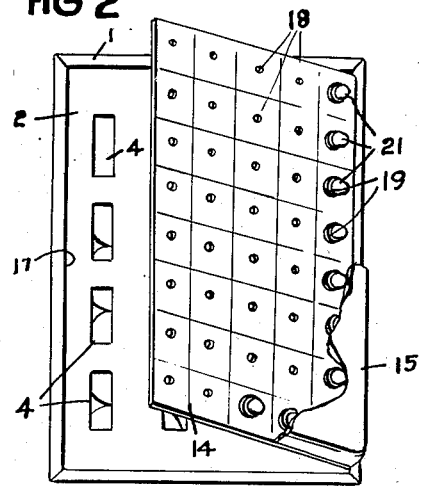
Figure 3:
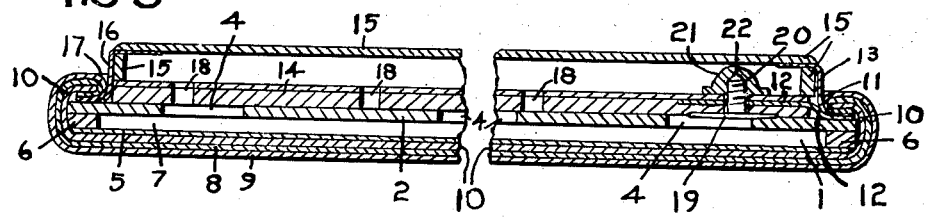
Fig. 3 is a transverse section.
Figure 4:
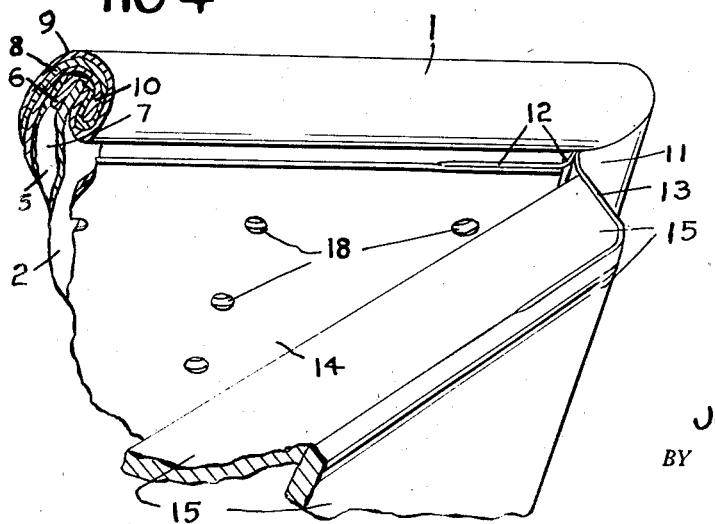
Fig. 4 is a fragmentary detail.

In drives to raise funds for churches and other organizations the use of savings banks of various forms and particularly the relatively flat type of coin banks suitable for mailing have been used. It is the purpose of my device, however, not only to facilitate the deposit and transmission of money but to encourage the remittance by the sale of tokens, medals, buttons and similar objects so that as each sale is made the deposit of the purchase price is witnessed by the purchaser and at the same time a token representing the transaction is removed from the magazine which is so secured to the bank that its removal will be at once detected. The capacity of the bank and also of the magazine are equal and also the removal of a token which is purchased is an indication and tally of the amount of the aggregate sales at all times so that the solicitor and purchaser of the token may check the amounts deposited and also the amounts to yet be received. The bank is provided with windows through which the monies may be counted and checked at all times with the tokens sold, which has the value of assuring the purchaser that the money is being properly applied so that the profits from the sales will be returned to the church or organization for which the money is being raised.

While my device is of use for campaign and money drives it will be apparent that it may also be used for other purposes in which the token delivered may be exchanged for other things of value.

It is my purpose herein to show and describe one of the constructions embodying the invention and its principles and modifications will suggest themselves to those skilled in the art to which my invention pertains after a study of the specification and drawing.

Referring to the drawing, I have provided a bank 1 comprising the slotted sheet of material 2 somewhat flexible particularly around the slot 3 to facilitate the insertion of the currency to be deposited. The sheet 2 is preferably provided with windows 4 through which the money deposited may be counted. The windows and slot are so proportioned that the removal of the money is made difficult if not impossible without detection; in fact, the bank is ordinarily destroyed when its contents are removed. Behind the sheet 2 and separating it from the back lining 5 is the frame 6 of sufficient thickness to form a chamber 7 between the sheet 2 and lining 5 to accommodate the money forced through the slot 3.

The sheet, frame and lining as well as the cover 8 and transparent cover 9 on its exterior are clamped and secured together by the metal member 10 which is so shaped and bent or turned over around its edges as to hold all of the parts of the bank together although the metal member is not seen because of the above parts concealing it.

Along one edge 11 of the bank and also clamped under the turned over edge of the metal member 10 are the flexible hinges 12 and 13 which permanently secure the magazine 14 and its housing 15 together each being thus separately swingingly mounted to the bank. The housing is preferably provided with the spring latch 16 which engages the turned over edge 17 of the bank 1 thereby detachably locking the bank and magazine together in the closed position and permitting the removal of the tokens when unlocked and swung open in relation to the bank.

The magazine is preferably provided with the apertures 18 which equal in number the tokens 19 which are stored in the magazine. The tokens each may be provided with the screwed stud 20 secured or formed integral at the back and thus concealed from view either when secured to the magazine or through the clothing of the purchaser by the nut 21 which receives the stud 20 and preferably shields or covers the pointed end 22 of said stud.

The tokens are shown in the drawing as crosses but may be emblems, badges, medals, buttons, etc., and may be secured in the magazine or to the wearer in other ways than by a stud and the number and size of the tokens may of course vary to suit the many uses to which my invention is adapted. Likewise the details of construction of the various parts of my device may be modified without departing from the principles embodied in and within the scope of my invention set forth in the appended claims.

I claim:

1. In a bank and magazine, a bank having a slotted sheet and a back cover and a frame between said sheet and cover, thereby forming a chamber for coins, a magazine and a flexible hinge secured thereto and a metal member having its edges turned over clamping said slotted sheet, said cover and said frame and clamping said flexible hinge under one of said turned over edges, thereby securing said magazine to said bank.

2. In a bank and magazine, a bank having a slotted sheet and a back cover and a frame between said sheet and cover, thereby forming a chamber for coins, a magazine and a flexible hinge secured thereto, and a metal member having its edges turned over clamping said slotted sheet, said cover and said frame and clamping said flexible hinge under one of said turned over edges, thereby securing said magazine to said bank, and a housing for said magazine and a hinge secured thereto clamped under one of the turned over edges of said metal member.

JOHN V. CAVALERO.